(12) United States Patent
Liu

(10) Patent No.: US 12,426,064 B2
(45) Date of Patent: Sep. 23, 2025

(54) METHOD FOR INFORMATION TRANSMISSION, COMMUNICATION DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 477 days.

(21) Appl. No.: 17/928,876

(22) PCT Filed: Jun. 30, 2020

(86) PCT No.: PCT/CN2020/099565
§ 371 (c)(1),
(2) Date: Nov. 30, 2022

(87) PCT Pub. No.: WO2022/000336
PCT Pub. Date: Jan. 6, 2022

(65) Prior Publication Data
US 2023/0232417 A1 Jul. 20, 2023

(51) Int. Cl.
*H04W 72/232* (2023.01)
*H04W 74/08* (2024.01)
*H04W 74/0833* (2024.01)
*H04W 74/0836* (2024.01)

(52) U.S. Cl.
CPC ..... *H04W 72/232* (2023.01); *H04W 74/0833* (2013.01); *H04W 74/0836* (2024.01)

(58) Field of Classification Search
CPC .............. H04L 5/0048; H04L 5/0053; H04W 72/0413; H04W 72/12; H04W 72/232; H04W 74/0833
See application file for complete search history.

(56) References Cited

U.S. PATENT DOCUMENTS

| 8,462,688 B1 | 6/2013 | Dinan | |
| 8,811,313 B2* | 8/2014 | Papasakellariou | H04W 72/02 370/329 |
| 9,603,048 B2* | 3/2017 | Pelletier | H04L 5/0053 |

(Continued)

FOREIGN PATENT DOCUMENTS

| CN | 105517182 A | 4/2016 |
| CN | 105764152 A | 7/2016 |

(Continued)

OTHER PUBLICATIONS

European Patent Application No. 20943151.9 Search and Opinion Jan. 5, 2024, 9 pages.

(Continued)

*Primary Examiner* — Alpus Hsu
(74) *Attorney, Agent, or Firm* — Cozen O'Connor

(57) ABSTRACT

A method for transmitting information is performed by a base station. The method comprises: sending downlink control information (DCI) carrying an enhanced control indication. The enhanced control indication comprises: an enhanced control parameter for random access of a first-type user equipment (UE) having a first reception capability. The enhanced control parameter is used for enhancing message transmission in a random access process for the first-type UE.

20 Claims, 4 Drawing Sheets

(56) References Cited

U.S. PATENT DOCUMENTS

| | | | |
|---|---|---|---|
| 9,788,322 B2* | 10/2017 | Wong | H04W 72/121 |
| 10,034,277 B2* | 7/2018 | Davydov | H04L 5/005 |
| 10,278,207 B2* | 4/2019 | Lee | H04W 56/00 |
| 10,306,615 B2* | 5/2019 | Chen | H04L 1/1812 |
| 10,333,676 B2* | 6/2019 | Zhang | H04L 5/0053 |
| 10,383,150 B2* | 8/2019 | Babaei | H04W 24/08 |
| 10,433,341 B2* | 10/2019 | Liu | H04W 74/0833 |
| 10,608,856 B2* | 3/2020 | Papasakellariou | H04L 5/003 |
| 2017/0245307 A1 | 8/2017 | Liu et al. | |
| 2018/0049068 A1* | 2/2018 | Agiwal | H04W 74/006 |
| 2019/0373645 A1* | 12/2019 | Babaei | H04W 72/23 |
| 2020/0015258 A1* | 1/2020 | Zhou | H04W 72/23 |
| 2020/0296635 A1* | 9/2020 | Rastegardoost | H04W 36/0064 |
| 2020/0396633 A1* | 12/2020 | Tseng | H04L 5/001 |
| 2021/0029746 A1* | 1/2021 | Turtinen | H04W 74/0833 |
| 2021/0243680 A1* | 8/2021 | Harada | H04W 72/23 |

FOREIGN PATENT DOCUMENTS

| | | |
|---|---|---|
| CN | 106162921 A | 11/2016 |
| EP | 3026830 A1 | 6/2016 |
| EP | 3618454 A1 | 3/2020 |
| WO | WO 2016025899 A1 | 2/2016 |
| WO | WO 2017028024 A1 | 2/2017 |
| WO | WO 2019141061 A1 | 7/2019 |

OTHER PUBLICATIONS

PCT/CN2020/099565 English translation of International Search Report dated Mar. 26, 2021, 2 pages.

Indian Patent Application No. 202347002860 Office Action dated Nov. 29, 2024, 7 pages.

* cited by examiner

METHOD FOR INFORMATION TRANSMISSION, COMMUNICATION DEVICE AND STORAGE MEDIUM

CROSS-REFERENCE TO RELATED APPLICATION

This application is the U.S. national phase application of International Application No. PCT/CN2020/099565, filed on Jun. 30, 2020, the entire disclosure of which is incorporated herein by reference.

TECHNICAL FIELD

The disclosure relates to, but is not limited to, a field of wireless communication technologies, and more particularly to a method and an apparatus for transmitting information, a communication device, and a storage medium.

BACKGROUND

Currently, a 3rd generation partnership project (3GPP) has carried out a research on reduced capability New Radio (NR) devices (REDCAP) with a standard version (R17, Release17), with a goal of reducing a complexity of a user equipment (UE) and saving a cost on the premise of coexisting with R15 UEs or R16 UEs.

The REDCAP UE generally has a small number of antennas and a limited volume. For example, the REDCAP UE only has one receiving antenna, with a downlink coverage performance being 6-7 dB lower than that of a UE with four receiving antennas. In addition, an antenna sensitivity performance decrease caused by miniaturization of the REDCAP UE leads to worse network coverage. Therefore, a communication system may select to perform coverage compensation or enhancement corresponding to a specific channel for such type of UE.

SUMMARY

According to a first aspect of the disclosure, a method for transmitting information is performed by a base station. The method includes:

sending downlink control information (DCI) carrying an enhanced control indication. The enhanced control indication includes enhanced control parameters for random access of a first type user equipment (UE) with a first receiving capability. The enhanced control parameters are configured to enhance message transmission of the first type UE in a random access procedure.

According to a second aspect of the disclosure, a method for transmitting information is performed by a user equipment (UE). The UE is a first type UE with a first receiving ability. The method includes:

receiving downlink control information (DCI); and obtaining an enhanced control indication carried by the DCI. The enhanced control indication includes enhanced control parameters for random access of the first type UE, and the enhanced control parameters are configured to enhance message transmission of the first type UE in a random access procedure.

According to a third aspect of the disclosure, there is provided a communication device. The communication device includes: a processor, a transceiver, a memory, and an executable program stored in the memory and operated by the processor. When the program is executed by the processor, the processor is configured to receive downlink control information (DCI); and obtain an enhanced control indication carried by the DCI. The enhanced control indication includes enhanced control parameters for random access of the first type UE, and the enhanced control parameters are configured to enhance message transmission of the first type UE in a random access procedure.

It should be understood that both the foregoing general description and the following detailed description are and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of embodiments of the disclosure together with the specification.

DETAILED DESCRIPTION

Embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following embodiments do not represent all implementations consistent with the disclosure. Instead, they are merely examples of apparatuses and methods consistent with aspects of embodiments of the disclosure as detailed in the appended claims.

The term employed in the embodiments of disclosure is merely for the purpose of describing a detailed embodiment, and is not intended to limit embodiments of the disclosure. As used in embodiments of the disclosure and the appended claims, a singular form "a/an" or "the/said" is also intended to include plural forms, unless the context clearly indicates other meaning. It should also be understood that, the term "and/or" as used herein refers to including any or all possible combinations of one or more associated listed items.

It should be understood that, although the terms such as "first, second, third" may be employed in embodiments of the disclosure to describe various kinds of information, these information should not be limited to these terms. These terms are merely used to distinguish a same type of information from each other. For example, without departing from a scope of embodiments of the disclosure, first information may also be called second information, and similarly, the second information may also be called the first information. Depending on the context, the word "if" as used herein may be interpreted as "when" or "in a case that . . . " or "in response to a determination".

Figure 1:
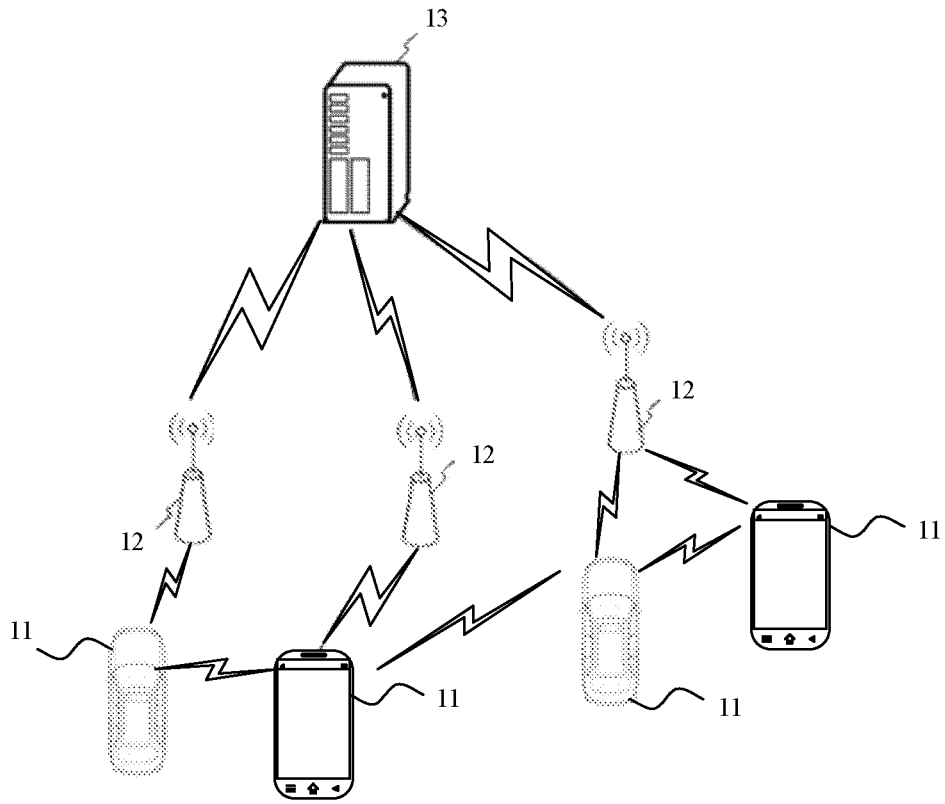
FIG. 1 is a structural schematic diagram illustrating a wireless communication system according to an embodiment.

Referring to FIG. 1, which is a structural schematic diagram illustrating a wireless communication system according to embodiments of the disclosure. As illustrated in FIG. 1, the wireless communication system is a communication system based on cellular mobile communication technologies. The wireless communication system may include several terminals 11 and several base stations 12.

The terminal 11 may be a device providing voice and/or data connectivity for a user. The terminal 11 may communicate with one or more core networks via a radio access network (RAN). The terminal 11 may be an Internet of Things terminal, such as, a sensor device, a mobile phone (or a "cellular" phone), or a computer with the Internet of Things terminal. The terminal 11 may be a fixed, portable, pocket-sized, handheld, computer-built or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be an unmanned aerial vehicle. Alternatively, the terminal 11 may be a vehicle-mounted/on-board device, such as, a driving computer with a wireless communication function, or a wireless communication device with an external driving computer. Alternatively, the terminal 11 may be a roadside device, such as a street lamp, a signal lamp or other roadside devices with the wireless communication function.

The base station 12 may be a network-side device in the wireless communication system. The wireless communication system may be the fourth generation mobile communication (4G) system, also known as a long term evolution (LTE) system. Alternatively, the wireless communication system may be the fifth generation (5G) system, also known as a new radio (NR) system or a 5G NR system. Alternatively, the wireless communication system may be a next-generation system following the 5G system. An access network in the 5G system may be called a new generation-radio access network (NG-RAN), or a machine-type communication (MTC) system.

The base station 12 may be an evolved Node base station (eNB) employed in the 4G system. Alternatively, the base station 12 may be a base station (gNB) with a centralized distributed architecture in the 5G system. The base station 12 generally includes a central unit (CU) and at least two distributed units (DUs) when employing the centralized distributed architecture. There are protocol stacks of a packet data convergence protocol (PDCP) layer, a radio link control (RLC) layer and a media access control (MAC) layer provided in the central unit. A protocol stack of a physical layer (PHY) is provided in the distribution unit. The specific implementation of the base station 12 is not limited in embodiments of the disclosure.

A wireless connection may be established between the base station 12 and the terminal 11 via a wireless air interface. In different implementations, the wireless air interface is a wireless air interface based on the 4G mobile communication network technology standard. Alternatively, the wireless air interface is a wireless air interface based on the 5G mobile communication network technology standard. For example, the wireless air interface is a new air interface. Alternatively, the wireless air interface may also be a wireless air interface based on a next generation mobile communication network technology standard following the 5G standard.

In some embodiments, the wireless communication system may also include a network management device 13.

The several base stations 12 are respectively connected to the network management device 13. The network management device 13 may be a core network device in the wireless communication system. For example, the network management device 13 may be a mobility management entity (MME) in an evolved packet core network (EPC). Alternatively, the network management device may be other core network device, such as a serving gateway (SGW), a public data network gateway (PGW), a policy and charging rule function (PCRF) or a home subscriber server (HSS). The implementation form of the network management device 13 is not limited in embodiments of the disclosure.

Execution entities involved in embodiments of the disclosure include, but are not limited to, an industrial sensor, a video surveillance, a UE such as a wearable device, and a base station which employ the 5G cellular mobile communication technologies for communication.

Embodiments of the disclosure apply to a scene where an enhanced mobile broadband (eMBB) UE and a REDCAP UE are allowed to simultaneously work in the communication system, and a same initial access bandwidth is configured in the communication system during an initial access procedure. In the scene, a coverage enhancement method is provided for an Msg2 corresponding to the REDCAP UE, which benefits the REDCAP UE to receive the Msg2. However, an Msg1 packet in the related art may affect an access success rate of the UEs. Therefore, the REDCAP UE may not be distinguished from other types of UEs when the UEs send the Msg2, thus the coverage enhancement method may not be correspondingly provided for the REDCAP UE in the Msg2. Meanwhile, since the REDCAP UE may not be distinguished from other types of UEs by the Msg1, Msg3 transmission of the REDCAP UE may not be enhanced in the network side.

Figure 2:
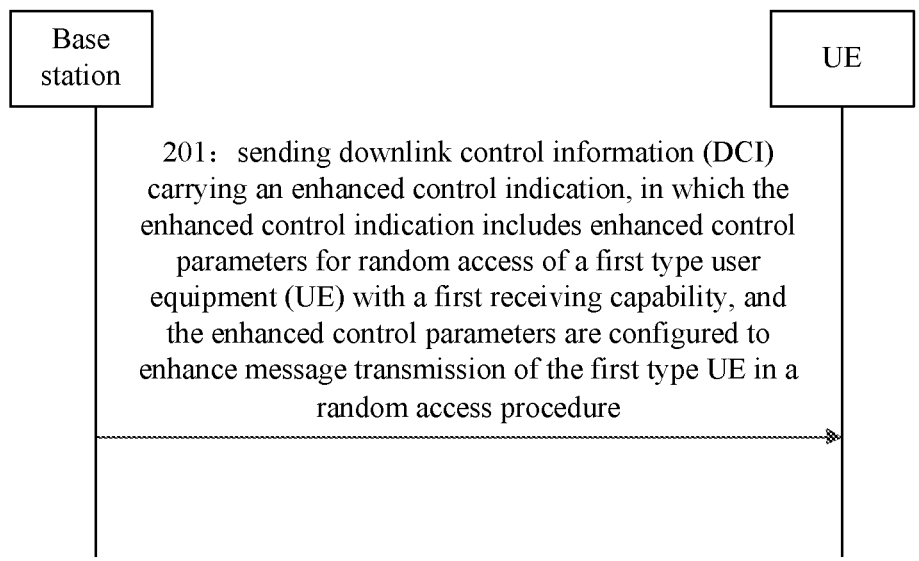
FIG. 2 is a flow chart illustrating a method for transmitting information according to an embodiment.

As illustrated in FIG. 2, embodiments of the disclosure provide a method for transmitting information. The method for transmitting information may be applied to a base station in the wireless communication system. The method includes the following steps.

At block 201, downlink control information (DCI) carrying an enhanced control indication is sent. The enhanced control indication includes enhanced control parameters for random access of a first type UE with a first receiving capability. The enhanced control parameters are configured to enhance message transmission of the first type UE in a random access procedure.

The first type UE may include, but be not limited to, the REDCAP UE in the R17 3GPP protocol. Compared with the eMBB UE, the REDCAP UE generally has a simple structure, such as has a smaller number of antennas. Meanwhile, the REDCAP UE generally has relatively weak signal receiving or sending capability in consideration of coexisting in the same cell as UEs such as the eMBB.

In an embodiment, the first receiving capability of the first type UE is lower than the second receiving capability of the second type UE.

A capability threshold may be set in advance. The capability threshold may be a number threshold of receiving or sending antennas, and/or a gain threshold of receiving or sending antennas. A UE with a receiving or sending capability lower than the capability threshold is determined as the first type UE. A UE with a receiving or sending capability greater than or equal to the capability threshold is determined as the second type UE.

The first type UE is different from the second type UE. The receiving or sending capability of the first type UE may be lower than that of the second type UE. The second type UE may be a UE, such as the eMBB UE.

In an embodiment, the number of antennas of the first type UE is lower than that of the second type UE.

A type of the UE may be determined based on the number of antennas and/or the gain of receiving or sending antennas. The first type UE may include the REDCAP UE, or a UE with a poor capability of receiving or sending signals.

A UE with the number of antennas lower than the antenna number threshold and/or the gain of receiving or sending antennas lower than the gain threshold is determined as the first type UE. A UE with the number of antennas greater than or equal to the antenna number threshold and/or the gain of receiving or sending antennas greater than or equal to the gain threshold is determined as the second type UE. Therefore, message transmission of the first type UE in the random access procedure may be enhanced.

For example, the enhanced control parameter may be an enhanced configuration for sending a downlink signaling. The downlink signaling transmission configured based on the enhanced control parameter may have a strong transmission performance or a good fault tolerance. Exemplarily, the enhanced control parameter may be an emitting power enhanced control parameter of the base station. Comparing with a non-predetermined type UE such as the eMBB UE, a power of the base station for sending the downlink signaling to the first type UE may be increased based on the emitting power enhanced control parameter, thus improving a signal strength of the downlink signaling received in the first type UE, and meeting a communication need of the first type UE.

Exemplarily, the enhanced control parameter may also be an enhanced control parameter for the number of transmission repetitions of the Msg2 or MsgB. The base station may inform the first type UE, via a signaling, of the number of transmission repetitions of the Msg2 or MsgB dedicated to the first type UE through the enhanced control parameter. The number of transmission repetitions of the Msg2 or MsgB dedicated to the first type UE is greater than that of other types of UEs (eMBB UE, etc.), thus enhancing the message (such as, Msg2 or MsgB) transmission in the random access procedure of the first type UE. In another embodiment, the enhanced control parameters may include the emitting power enhanced control parameter, the transmission repetition enhanced control parameters, or other enhanced control parameters, to implement enhancement for the message transmission of the first type UE in the random access procedure, relative with other types of UEs.

For another example, the enhanced control parameter may be an enhanced configuration for sending an uplink signaling (such as, Msg3), and uplink signaling transmission configured based on the enhanced control parameter may have a strong transmission performance or a good fault tolerance. Exemplarily, the enhanced control parameter may be an emitting power enhanced control parameter of the UE. Comparing with the non-predetermined types of UEs such as the eMBB UE, a power of the UE for sending the uplink signaling may be increased based on the emitting power enhanced control parameter, thus increasing a signal strength of the uplink signaling sent by the first type UE, such that the base station may receive the uplink signaling more effectively. Exemplarily, the enhanced control parameter may also be an enhanced control parameter for the number of transmission repetitions of the Msg3. Based on the enhanced control parameter, the base station may inform the first type UE, via a signaling, of the number of transmission repetitions of the Msg3 dedicated to the first type UE or an offset value of the number of transmission repetitions of the Msg3 dedicated to the first type UE, such that the number of transmission repetitions of the Msg3 dedicated to the first type UE is greater than that of other types of UEs (the eMBB UE, etc.), thus enhancing the message (e.g., Msg3) transmission in the random access procedure of the first type UE. Similarly, the enhanced control parameters for uplink signaling transmission may include the emitting power enhanced control parameter of the UE, the transmission repetition enhanced control parameter, or other enhanced control parameters.

In an embodiment, the enhanced control parameter may indicate information associated with the number of transmission repetitions of the Msg3. For example, the enhanced control parameter may directly indicate the number of transmission repetitions that the UE sends the Msg3. When transmission repetition number information of the Msg3 is carried in the DCI, the UE receiving the DCI preferentially sends the Msg3 based on the transmission repetition number information of the Msg3 in the DCI, without considering transmission repetition number information of the Msg3 received in an RAR message. In an alternative embodiment, the enhanced control parameter may indicate the offset value of the number of transmission repetitions of the Msg3 sent by the UE. When the offset value information of the number of transmission repetitions of the Msg3 is carried in the DCI, the UE receiving the DCI obtains a final number of transmission repetitions of the Msg3 in combination of the offset value information and on the basis of transmission repetition number information of the Msg3 indicated in the RAR message. In a detailed example, assuming that the offset value information of the number of transmission repetitions of the Msg3 carried in the DCI indicates that the offset value is 3, and the number of transmission repetitions of the Msg3 in the RAR received by the UE is 6, it is determined by the UE that the final number of transmission repetitions that the Msg3 needs to be repeatedly sent is 9. The UE sends the Msg3 based on the final number of transmission repetitions of the Msg3.

The base station may employ the enhanced control parameters for the first type UE, but not for the second type UE.

The base station may configure the enhanced control parameters in the DCI. The first type UE may obtain the enhanced control parameters from the DCI and receive the downlink signaling based on the enhanced control parameters. The second type UE may not read or may ignore the enhanced control parameters.

In this way, the base station configures the enhanced control parameters in the DCI for the first type UE. On the one hand, the downlink signaling for the first type UE may be sent based on the enhanced control parameters, such that the transmission for the downlink signaling is improved relative to other types of UEs. In this way, a receiving strength need of the first type UE with the poor receiving capability is met, a success rate of receiving a wireless signal at the first type UE is improved, retransmission due to reception failure of the UE is reduced, and the utilization efficiency of transmission resources is further improved. Alternatively, the uplink signaling may be received from the first type UE based on the enhanced control parameters, such that the uplink signaling transmission of the first type of UE is improved relative to other types of UEs, thus meeting a sending strength need of the first type UE with the poor transmission capability, and improving the success rate of receiving the uplink signaling at the base station. On the other hand, the first type UE does not need to report a type of UE, thus reducing interaction and improving communication efficiency.

In an embodiment, the enhanced control parameters may at least include the enhanced control parameters of the RAR for the first type UE. The description is made below to the principle of the disclosure by taking the enhanced control parameters for the RAR of the first type UE as an example, without any limitation on the protection scope of the disclosure. Without departing from the scope of the disclosure, those skilled in the art may obtain technical solutions for other types of enhanced control parameters by reading following contents, and these technical solutions are included in the contents disclosed in the application.

In the random access procedure, the UE first sends a random access preamble to the base station for requesting access to the base station. The base station sends a RAR to the UE in response to receiving the random access preamble. The RAR is carried by a PDSCH signaling. The base station may first send an RAR PDCCH signaling carrying the DCI when sending the PDSCH signaling, in which the DCI may be configured to schedule PDSCH resources for transmitting the PDSCH signaling, and to indicate modulation and coding strategy information of the PDSCH signaling.

The UE monitors the RAR PDCCH signaling in an RAR time window after sending the random access preamble, parses the DCI in the PDCCH signaling, and receives the RAR on the parsed PDSCH resources. The RAR time window starts with a first symbol of a first control resource set (CORESET) in a predetermined slot separated from the slot of the UE sending the random access preamble, and the DCI is carried in the CORESET. The CORESET is determined by the UE based on a received system information block (SIB).

The enhanced control parameters may be an enhanced resource configuration for sending the RAR and/or an emitting parameter configuration of a radio frequency component. The RAR is sent by the base station based on the enhanced control parameters, which may improve a signal quality of an RAR carrier and/or a fault-tolerant ability of an RAR decoding. The RAR sent based on the enhanced control parameters may better meet a need of the first type UE on a receiving strength and/or signal quality of the RAR. The enhanced control parameters may include an emitting power enhanced control parameter of the base station emitting the RAR, and/or the transmission repetition enhanced control parameter of the RAR.

Exemplarily, the enhanced control parameter may be the emitting power enhanced control parameter. The base station may send the RAR to the first type UE based on the emitting power enhanced control parameter. Compared with the second type UE such as the eMBB UE, a power of the base station sending the RAR to the first type UE may be increased by the emitting power enhanced control parameter, thus improving a signal strength of the RAR received by the first type UE, and meeting the communication need of the first type UE.

Exemplarily, the enhanced control parameter may be the enhanced control parameter for the number of transmission repetitions of the Msg2 or MsgB. The base station may inform the first type UE, via a signaling, of the number of transmission repetitions of the Msg2 or MsgB dedicated to the first type UE based on the enhanced control parameter. The number of transmission repetitions of the Msg2 or MsgB dedicated to the first type UE is greater than that of other types of UEs (such as the eMBB UE), thus enhancing the message (such as, the Msg) transmission in the random access procedure of the first type UE.

The base station may configure the enhanced control parameter in the DCI of the RAR PDCCH signaling. The first type UE may obtain the enhanced control parameter in the DCI, and receive the RAR carried by the PDSCH signaling based on the enhanced control parameter. The second type UE may not read or may ignore the enhanced control parameter.

In this way, the base station may send the RAR of the first type UE based on the enhanced control parameter, such that RAR transmission may meet the receiving strength need of the first type UE, thus improving the success rate of receiving the RAR in the UE, reducing retransmission of the base station due to reception failure, and further improving the utilization efficiency of transmission resources.

Figure 3:
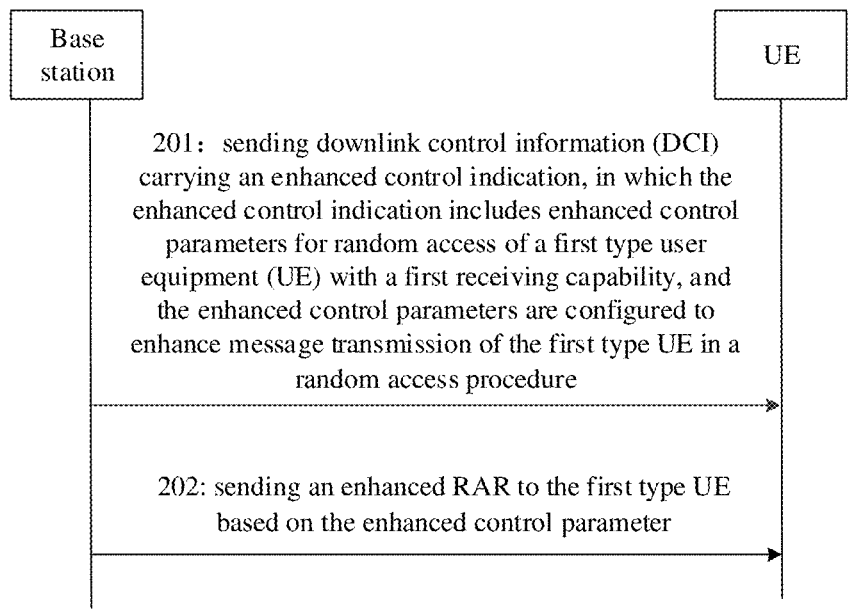
FIG. 3 is a flow chart illustrating another method for transmitting information according to an embodiment.

In an embodiment, as illustrated in FIG. 3, the method also includes the following steps.

At block 202, an enhanced RAR is sent to the first type UE based on the enhanced control parameter.

The base station may configure the enhanced control parameter in the DCI of the RAR PDCCH signaling, and send the RAR based on the enhanced control parameter. The first type UE may obtain the enhanced control parameter from the DCI, and receive the RAR carried by the RAR PDSCH signaling based on the enhanced control parameter. The second type UE may not read or may ignore the enhanced control parameter.

The first type UE receives the RAR based on the enhanced control parameter carried by the DCI in the RAR PDCCH signaling, which may improve the success rate of receiving the RAR.

In an embodiment, the enhanced control parameter may include an enhanced control parameter for an Msg3 in a 4-step random access procedure of the first type UE.

The enhanced control parameter may be the enhanced configuration for sending the uplink signaling (such as, Msg3), and uplink signaling transmission configured based on the enhanced control parameter may have a strong transmission performance or a good fault tolerance. Exemplarily, the enhanced control parameter may be the emitting power enhanced control parameter of the UE. Comparing with the non-predetermined types of UEs such as the eMBB UE, the power of the UE for sending the uplink signaling may be increased based on the emitting power enhanced control parameter, thus increasing the signal strength of the uplink signaling sent by the first type UE, such that the base station may receive the uplink signaling more effectively. Exemplarily, the enhanced control parameter may also be the enhanced control parameter for the number of transmission repetitions of the Msg3. Based on the enhanced control parameter, the base station may inform the first type UE, via a signaling, of the number of transmission repetitions of the Msg3 dedicated to the first type UE or the offset value of the number of transmission repetitions of the Msg3 dedicated to the first type UE, such that the number of transmission repetitions of the Msg3 dedicated to the first type UE is greater than that of other types of UEs (the eMBB UE, etc.), thus enhancing the message (e.g., Msg3) transmission in the random access procedure of the first type UE. Similarly, the enhanced control parameters for uplink signaling transmission may include the emitting power enhanced control parameter of the UE, the transmission repetition enhanced control parameter, or other enhanced control parameters.

In an embodiment, the enhanced control parameter for the Msg3 of the first type UE indicates the offset value of the number of transmission repetitions of the Msg3.

In an embodiment, the enhanced control parameter may indicate the information associated with the number of transmission repetitions of the Msg3. For example, the enhanced control parameter may directly indicate the repetition number of sending the Msg3 by the UE. When transmission repetition number information of the Msg3 is carried in the DCI, the UE receiving the DCI preferentially sends the Msg3 based on the transmission repetition number information of the Msg3 in the DCI, without considering transmission repetition number information of the Msg3 received in the RAR message. In an alternative embodiment, the enhanced control parameter may indicate the offset value of the number of transmission repetitions of the Msg3 sent by the UE. When the offset value information of the number of transmission repetitions of the Msg3 is carried in the DCI, the UE receiving the DCI obtains a final number of transmission repetitions of the Msg3 in combination of the offset value information and on the basis of the transmission repetition number information of the Msg3 indicated in the RAR message. In a detailed example, assuming that the offset value information of the number of transmission repetitions of the Msg3 carried in the DCI indicates that the offset value is 3, and the number of transmission repetitions of the Msg3 in the RAR received by the UE is 6, it is determined by the UE that the final number of transmission repetitions that the Msg3 needs to be repeatedly sent is 9. The UE sends the Msg3 based on the final number of transmission repetitions of the Msg3.

In an embodiment, the enhanced control indication is also configured to indicate whether to apply the enhanced control parameter.

One or more bits may be configured in the DCI to indicate whether to enhance sending the RAR.

Exemplarily, the one or more bits in the DCI configured to indicate whether to enhance sending the RAR may be independent. For example, as illustrated in Table 1, one bit may be configured to indicate whether to enhance sending the RAR.

TABLE 1

| Enhanced control indication | Whether to enhance sending the RAR |
|---|---|
| 0 | No |
| 1 | YES |

The base station may also indicate whether to enhance sending the RAR based on the enhanced control parameter. When there is the enhanced control parameter, it indicates enhancing sending the RAR. When there is no enhanced control parameter, it indicates that sending the RAR is not enhanced.

In an embodiment, sending the DCI carrying the enhanced control indication includes:

sending the DCI for scheduling the random access resource and carrying the enhanced control indication.

Here, the DCI may be configured to schedule the random access resource in the random access procedure of the UE. The UE may monitor the DCI on the PDCCH resources. The DCI may be configured to schedule the PDSCH resources for random access.

For example, the DCI is configured to schedule the 2-step random access resources or 4-step random access resources.

In the 2-step random access procedure, first, the random access preamble is carried in a message A (MsgA) at the UE. The RAR is carried in a message B (MsgB) at the base station. The DCI of the RAR PDCCH signaling is carried in the MsgB. The enhanced control parameter may be carried in the MsgB. An Msg B-radio network temporary identity (RNTI) is employed to scramble cyclic redundancy check (CRC) by the DCI in the MsgB.

In the 4-step random access procedure, first, the random access preamble is carried in a message 1 (Msg1) at the UE. The RAR is carried in the Msg1 at the base station. The DCI of the RAR PDCCH signaling is carried in the Msg1. The enhanced control parameter may be carried in the Msg1. An RA-RNTI to scramble the CRC is employed by the DCI in the Msg1.

In an embodiment, the enhanced control indication is carried by a reserved bit of the DCI.

The enhanced control parameter may be set in the reserved bit of the DCI. The first type UE may parse content in the reserved bit when receiving the DCI. The UEs other than the first type UE may not perform the content in the reserve bit.

Exemplarily, all the reserved bits are 0, or 1 in a case that the base station has no enhancement for the first type UE;

k reserved bits may be encoded to correspond to different indication configurations in a case that the base station is provided with enhancement for the first type UE.

The reserved bits are employed to carry the enhanced control parameters. The first type UE parses the reserved bits, while other types of UEs than the first type UE do not parse the reserved bits, which may improve the compatibility of the DCI for different types of UEs.

In an embodiment, the enhanced control parameters may include a transmission repetition parameter of the RAR.

The transmission repetition parameter may be a repetition resource configuration. The base station may repeat the downlink transmission to achieve an effect of power accumulation. The first type UE may combine and decode the RARs received repeatedly, thus improving the success rate of decoding the RARs and the success rate of the first type UE receiving the RARs.

Exemplarily, one or more repetitions may be employed. For example, as illustrated in Table 2, 0 may represent one transmission repetition, and 1 may represent two transmission repetitions.

TABLE 2

| transmission repetition parameter | the number of repetitions |
|---|---|
| 0 | 1 |
| 1 | 2 |

In an embodiment, the enhanced control parameter may include a power boosting parameter of the RAR. The power boosting parameter may be a resource configuration for power boosting. The base station may increase a power of a signal by applying the resource configuration of the power boosting, thus improving the strength of the signal received by the first type UE. In this way, a need of the first type UE for the signal strength is met, and the success rate of the first type UE receiving the RAR is improved.

In an embodiment, the DCI is configured to schedule the 2-step random access resources of the first type UE. The enhanced control parameter may include a duration parameter of a monitoring time window of the RAR.

In the 2-step random access procedure, the first type UE receives the RAR in the RAR monitoring time window. Therefore, when the enhanced control parameters include the transmission repetition parameter, that is, the base station may send the RAR repeatedly to achieve the effect of power accumulation. A time domain position of the RAR sent repeatedly may exceed a time domain position of the RAR monitoring time window. Therefore, the RAR monitoring time window may be extended, such as extending the duration of the RAR monitoring time window. The duration parameter may be configured to indicate a duration of an extended RAR monitoring time window or an extended duration.

The first type UE may determine the current RAR monitoring time window after extending the duration when receiving the duration parameter, and monitor and receive the RAR within the current RAR monitoring time window after extending the duration.

In this way, the RARs sent repeatedly may be received completely. The first type UE may combine and decode the RARs received repeatedly, thus improving the success rate of decoding the RARs, and the success rate of the first type UE receiving the RARs.

In an embodiment, the duration of the monitoring time window of the RAR of the first type UE is longer than that of the RAR of the second type UE.

Since the first type UE has a lower receiving capacity than the second type UE, the base station needs to repeatedly send the RAR to improve the receiving success rate of the first type UE. Therefore, the RAR monitoring time window may be extended for the first type UE, such that the first type UE may completely receive the RARs sent repeatedly. The first type UE may combine and decode the RARs received repeatedly, thus improving the success rate of decoding the RARs, and the success rate of the first type UE receiving the RARs.

In an embodiment, the duration parameter of the monitoring time window of the RAR includes the number of slots of the monitoring time window.

The duration of the monitoring time window may be expressed by the number of slots, so a time window extending parameter may be employed to indicate the number of increased slots in the RAR monitoring time window.

Exemplarily, the duration parameter may occupy multiple bits to indicate the number of increased slots. For example, as illustrated in Table 3, 01 may represent increasing one slot, and 10 may represent increasing two slots.

TABLE 3

| Time window extending parameter | The number of increased slots |
| --- | --- |
| 01 | 1 |
| 10 | 2 |

The duration parameter may also indicate the number of slots in the extended RAR monitoring time window. Exemplarily, the duration parameter may indicate that the number of slots in the extended RAR monitoring time window is 12.

Figure 4:
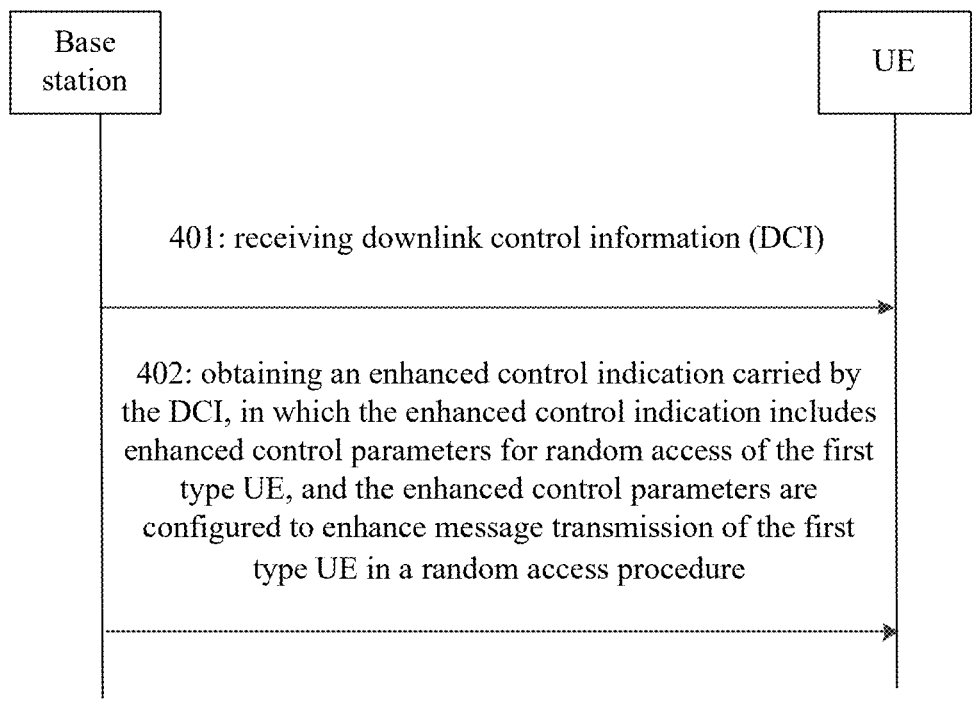
FIG. 4 is a flow chart illustrating yet another method for transmitting information according to an embodiment.

As illustrated in FIG. 4, an embodiment provides a method for transmitting information. The method for transmitting information may be applied to a UE in a wireless communication. The UE is the first type UE with a first receiving capability. The method for transmitting information includes the following steps.

At block 401, downlink control information (DCI) is received.

At block 402, an enhanced control indication carried by the DCI is obtained. The enhanced control indication includes an enhanced control parameter for random access of the first type UE, and the enhanced control parameter is configured to enhance message transmission of the first type UE in a random access procedure.

The first type UE may include, but be not limited to, a REDCAP UE in the R17 3GPP protocol. Compared with the eMBB UE, the REDCAP UE generally has a simple structure, such as has a smaller number of antennas. Meanwhile, the REDCAP UE generally has relatively weak signal receiving or sending capability in consideration of coexisting in the same cell as UEs such as the eMBB UE.

In an embodiment, the first receiving capability of the first type UE is lower than a second receiving capability of a second type UE.

A capability threshold may be set in advance. The capability threshold may be a number threshold of receiving or sending antennas, and/or a gain threshold of receiving or sending antennas. A UE with a receiving or sending capability lower than the capability threshold is determined as the first type UE. A UE with a receiving or sending capability greater than or equal to the capability threshold is determined as the second type UE.

The first type UE is different from the second type UE. The receiving or sending capability of the first type UE may be lower than that of the second type UE. The second type UE may be a UE, such as the eMBB UE.

In an embodiment, the number of antennas of the first type UE is lower than that of the second type UE.

A type of the UE may be determined based on the number of antennas and/or the gain of receiving or sending antennas. The first type UE may include the REDCAP UE, or a UE with a poor capability of receiving or sending signals.

A UE with the number of antennas lower than the antenna number threshold and/or the gain of receiving or sending antennas lower than the gain threshold is determined as the first type UE. A UE with the number of antennas greater than or equal to the antenna number threshold and/or the gain of receiving or sending antennas greater than or equal to the gain threshold is determined as the second type UE. Therefore, message transmission of the first type UE in the random access procedure may be enhanced.

For example, the enhanced control parameter may be an enhanced configuration for sending a downlink signaling. The downlink signaling transmission configured based on the enhanced control parameter may have a strong transmission performance or a good fault tolerance. Exemplarily, the enhanced control parameter may be an emitting power enhanced control parameter of the base station. Comparing with a non-predetermined type UE such as the eMBB UE, a power of the base station for sending the downlink signaling to the first type UE may be increased based on the emitting power enhanced control parameter, thus improving a signal strength of the downlink signaling received in the first type UE, and meeting a communication need of the first type UE.

Exemplarily, the enhanced control parameter may also be an enhanced control parameter for the number of transmission repetitions of the Msg2 or MsgB. The base station may inform the first type UE, via the signaling, of the number of transmission repetitions of the Msg2 or MsgB dedicated to the first type UE based on the enhanced control parameter. The number of transmission repetitions of the Msg2 or MsgB dedicated to the first type UE is greater than that of other types of UEs (eMBB UE, etc.), thus enhancing the message (such as, Msg2 or MsgB) transmission in the random access procedure of the first type UE. In another embodiment, the enhanced control parameters may include the emitting power enhanced control parameter, the transmission repetition enhanced control parameter, or other enhanced control parameters, to implement enhancement for the message transmission of the first type UE in the random access procedure, relative with other types of UEs.

For another example, the enhanced control parameter may be an enhanced configuration for sending an uplink signaling (such as, Msg3), and uplink signaling transmission configured based on the enhanced control parameter may have a strong transmission performance or a good fault tolerance. Exemplarily, the enhanced control parameter may be an emitting power enhanced control parameter of the UE. Comparing with the non-predetermined types of UEs such as the eMBB UE, a power of the UE for sending the uplink signaling may be increased based on the emitting power enhanced control parameter, thus increasing a signal strength of the uplink signaling sent by the first type UE, such that the base station may receive the uplink signaling more effectively. Exemplarily, the enhanced control parameter may also be an enhanced control parameter for the number of repeated transmissions of the Msg3. Based on the enhanced control parameter, the base station may inform the first type UE, via signaling, of the number of transmission repetition s of the Msg3 dedicated to the first type UE or an offset value of the number of transmission repetition s of the Msg3 dedicated to the first type UE, such that the number of transmission repetition s of the Msg3 dedicated to the first type UE is greater than that of other types of UEs (the eMBB UE, etc.), thus enhancing the message (e.g., Msg3) transmission in the random access procedure of the first type UE. Similarly, the enhanced control parameters for uplink signaling transmission may include the emitting power enhanced control parameter of the UE, the transmission repetition enhanced control parameter, or other enhanced control parameters.

In an embodiment, the enhanced control parameter may indicate information associated with the number of transmission repetitions of the Msg3. For example, the enhanced control parameter may directly indicate the number of transmission repetitions of the Msg3 that the UE sends the Msg3. When transmission repetition number information of the Msg3 is carried in the DCI, the UE receiving the DCI preferentially sends the Msg3 based on the transmission repetition number information of the Msg3 in the DCI, without considering transmission repetition number information of the Msg3 received in an RAR message. In an alternative embodiment, the enhanced control parameter may indicate the offset value of the number of transmission repetitions of the Msg3 sent by the UE. When offset value information of the number of transmission repetitions of the Msg3 is carried in the DCI, the UE receiving the DCI obtains a final number of transmission repetitions of the Msg3 in combination of the offset value information and on the basis of transmission repetition number information of the Msg3 indicated in the RAR message. In a detailed example, assuming that the offset value information of the number of transmission repetitions of the Msg3 carried in the DCI indicates that the offset value is 3, and the number of transmission repetitions of the Msg3 in the RAR received by the UE is 6, it is determined by the UE that the final number of transmission repetitions that the Msg3 needs to be repeatedly sent is 9. The UE sends the Msg3 based on the final number of transmission repetitions of the Msg3.

The base station may employ the enhanced control parameters for the first type UE, but not for the second type UE.

The base station may configure the enhanced control parameters in the DCI. The first type UE may obtain the enhanced control parameters from the DCI and receive the downlink signaling based on the enhanced control parameters. The second type UE may not read or may ignore the enhanced control parameters.

In this way, the base station configures the enhanced control parameters in the DCI for the first type UE. On the one hand, the downlink signaling for the first type UE may be sent based on the enhanced control parameters, such that the transmission for the downlink signaling is improved relative to other types of UEs. In this way, a receiving strength need of the first type UE with the poor receiving capability is met, a success rate of receiving a wireless signal at the first type UE is improved, retransmission due to reception failure of the UE is reduced, and the utilization efficiency of transmission resources is further improved. Alternatively, the uplink signaling may be received from the first type UE based on the enhanced control parameters, such that the uplink signaling transmission of the first type of UE is improved relative to other types of UEs, thus meeting a sending strength need of the first type UE with the poor transmission capability, and improving the success rate of receiving the uplink signaling at the base station. On the other hand, the first type UE does not need to report a type of UE, thus reducing interaction and improving communication efficiency.

In an embodiment, the enhanced control parameters may at least include the enhanced control parameters of the RAR for the first type UE. The description is made below to the principle of the disclosure by taking the enhanced control parameters for the RAR of the first type UE as an example, without any limitation on the protection scope of the disclosure. Without departing from the scope of the disclosure, those skilled in the art may obtain technical solutions for other types of enhanced control parameters by reading following contents, and these technical solutions are included in the contents disclosed in the application.

In the random access procedure, the UE first sends a random access preamble to the base station for requesting access to the base station. The base station sends a RAR to the UE in response to receiving the random access preamble. The RAR is carried by a PDSCH signaling. The base station may first send an RAR PDCCH signaling carrying the DCI when sending the PDSCH signaling, in which the DCI may be configured to schedule PDSCH resources for transmitting the PDSCH signaling, and to indicate modulation and coding strategy information of the PDSCH signaling.

The UE monitors the RAR PDCCH signaling in an RAR time window after sending the random access preamble, parses the DCI in the PDCCH signaling, and receives the RAR on the parsed PDSCH resources. The RAR time window starts with a first symbol of a first CORESET in a predetermined slot separated from the slot of the UE sending the random access preamble, and the DCI is carried in the CORESET. The CORESET is determined by the UE based on a received system information block (SIB).

The enhanced control parameters may be an enhanced resource configuration for sending the RAR and/or an emitting parameter configuration of a radio frequency component. The RAR is sent by the base station based on the enhanced control parameters, which may improve a signal quality of an RAR carrier and/or a fault-tolerant ability of an RAR decoding. The RAR sent based on the enhanced control parameters may better meet a need of the first type UE on a receiving strength and/or signal quality of the RAR. The enhanced control parameters may include an emitting power enhanced control parameter of the base station emitting the RAR, and/or the transmission repetition enhanced control parameter of the RAR.

Exemplarily, the enhanced control parameter may be the emitting power enhanced control parameter. The base station may send the RAR to the first type UE based on the emitting power enhanced control parameter. Comparing with the second type UE such as the eMBB UE, the base station may send the RAR to the first type UE by increasing the emitting power enhanced control parameter, thus improving a signal strength of the RAR received by the first type UE, and meeting the communication need of the first type UE.

Exemplarily, the enhanced control parameter may be the enhanced control parameter for the number of transmission repetitions of the Msg2 or MsgB. The base station may inform the first type UE, via a signaling, of the number of transmission repetitions of the Msg2 or MsgB dedicated to the first type UE based on the enhanced control parameter. The number of transmission repetitions of the Msg2 or MsgB dedicated to the first type UE is greater than that of other types of UEs (such as the eMBB UE), thus enhancing the message (such as, the Msg) transmission in the random access procedure of the first type UE.

In this way, the base station may send the RAR of the first type UE based on the enhanced control parameter, such that the RAR transmission may meet the receiving strength need of the first type UE, thus improving the success rate of receiving the RAR in the UE, reducing retransmission of the base station due to reception failure, and further improving the utilization efficiency of transmission resources.

In an embodiment, the method also includes the following steps.

An enhanced RAR is received based on the enhanced control parameter.

The base station may configure the enhanced control parameter in the DCI of the RAR PDCCH signaling, and send the RAR based on the enhanced control parameter. The first type UE may obtain the enhanced control parameter from the DCI, and receive the RAR carried by the RAR PDSCH signaling based on the enhanced control parameter. The second type UE may not read or may ignore the enhanced control parameter.

The first type UE receives the RAR based on the enhanced control parameter carried by the DCI in the RAR PDCCH signaling, which may improve the success rate of receiving the RAR.

In an embodiment, the enhanced control parameter may include an enhanced control parameter for an Msg3 in a 4-step random access procedure of the first type UE.

The enhanced control parameter may be the enhanced configuration for sending the uplink signaling (such as, Msg3), and the uplink signaling transmission configured based on the enhanced control parameter may have a strong transmission performance or a good fault tolerance. Exemplarily, the enhanced control parameter may be the emitting power enhanced control parameter of the UE. Comparing with the non-predetermined types of UEs such as the eMBB UE, the power of the UE for sending the uplink signaling may be increased based on the emitting power enhanced control parameter, thus increasing the signal strength of the uplink signaling sent by the first type UE, such that the base station may receive the uplink signaling more effectively. Exemplarily, the enhanced control parameter may also be the enhanced control parameter for the number of repeated transmissions of the Msg3. Based on the enhanced control parameter, the base station may inform the first type UE, via a signaling, of the number of repeated transmissions of the Msg3 dedicated to the first type UE or the offset value of the number of repeated transmissions of the Msg3 dedicated to the first type UE, such that the number of repeated transmissions of the Msg3 dedicated to the first type UE is greater than that of other types of UEs (the eMBB UE, etc.), thus enhancing the message (e.g., Msg3) transmission in the random access procedure of the first type UE. Similarly, the enhanced control parameters for uplink signaling transmission may include the emitting power enhanced control parameter of the UE, the transmission repetition enhanced control parameter, or other enhanced control parameters.

In an embodiment, the enhanced control parameter for the Msg3 of the first type UE indicates the offset value of the number of transmission repetitions of the Msg3.

In an embodiment, the enhanced control parameter may indicate the information associated with the number of transmission repetitions of the Msg3. For example, the enhanced control parameter may directly indicate the repetition number of sending the Msg3 by the UE. When transmission repetition number information of the Msg3 is carried in the DCI, the UE receiving the DCI preferentially sends the Msg3 based on the transmission repetition number information of the Msg3 in the DCI, without considering transmission repetition number information of the Msg3 received in the RAR message. In an alternative embodiment, the enhanced control parameter may indicate the offset value of the number of transmission repetitions of the Msg3 sent by the UE. When the offset value information of the number of transmission repetitions of the Msg3 is carried in the DCI, the UE receiving the DCI obtains a final number of transmission repetitions of the Msg3 in combination of the offset value information and on the basis of the transmission repetition number information of the Msg3 indicated in the RAR message. In a detailed example, assuming that the offset value information of the number of transmission repetitions of the Msg3 carried in the DCI indicates that the offset value is 3, and the number of transmission repetitions of the Msg3 in the RAR received by the UE is 6, it is determined by the UE that the final number of transmission repetitions that the Msg3 needs to be repeatedly sent is 9. The UE sends the Msg3 based on the final number of transmission repetitions of the Msg3.

In an embodiment, the method also includes:
determining whether a base station applies the enhanced control parameters based on the enhanced control indication.

One or more bits may be configured in the DCI to indicate whether to enhance sending the RAR.

Exemplarily, the one or more bits in the DCI configured to indicate whether to enhance sending the RAR may be independent. For example, as illustrated in Table 1, one bit may be configured to indicate whether to enhance sending the RAR.

The base station may also indicate whether to enhance sending the RAR by using the enhanced control parameter. When there is the enhanced control parameter, it indicates enhancing sending the RAR. When there is no enhanced control parameter, it indicates that sending the RAR is not enhanced.

In an embodiment, sending the DCI carrying the enhanced control indication includes:
sending the DCI for scheduling the random access resource and carrying the enhanced control indication.

Here, the DCI may be configured to schedule the random access resource in the random access procedure of the UE. The UE may monitor the DCI on the PDCCH resources. The DCI may be configured to schedule the PDSCH resources for random access.

For example, the DCI is configured to schedule the 2-step random access resources or 4-step random access resources.

In the 2-step random access procedure, first, the random access preamble is carried a message A (MsgA) in the UE. The RAR is carried in a message B (MsgB) in the base station. The DCI of the RAR PDCCH signaling is carried in the MsgB. The enhanced control parameter may be carried in the MsgB. An Msg B-RNTI is employed to scramble CRC in the DCI in the MsgB.

In the 4-step random access procedure, first, the random access preamble is carried in a message 1 (Msg1) in the UE. The RAR is carried in the Msg1 in the base station. The DCI of the RAR PDCCH signaling is carried in the Msg1. The enhanced control parameter may be carried in the Msg1. An RA-RNTI to scramble the CRC is employed in the DCI in the Msg1.

In an embodiment, the enhanced control indication is carried by a reserved bit of the DCI.

The enhanced control parameter may be set in the reserved bit of the DCI. The first type UE may parse content in the reserved bit when receiving the DCI. The UEs other than the first type UE may not parse the content in the reserve bit.

Exemplarily, all the reserved bits are 0, or 1 in a case that the base station has no enhancement for the first type UE;

k reserved bits may be encoded to correspond to different indication configurations in a case that the base station is provided with enhancement for the first type UE.

The reserved bits are employed to carry the enhanced control parameters. The first type UE parses the reserved bits, while other types of UEs than the first type UE do not parse the reserved bits, which may improve the compatibility of the DCI for different types of UEs.

In an embodiment, the enhanced control parameters may include a transmission repetition parameter of the RAR.

The transmission repetition parameter may be a repetition resource configuration. The base station may repeat the downlink transmission to achieve an effect of power accumulation. The first type UE may combine and decode the RARs received repeatedly, thus improving the success rate of decoding the RAR and the success rate of the first type UE receiving the RAR.

Exemplarily, one or more repetitions may be employed. For example, as illustrated in Table 2, 0 may represent one transmission repetition, and 1 may represent two transmission repetitions.

In an embodiment, the enhanced control parameter may include a power boosting parameter of the RAR. The power boosting parameter may be a resource configuration for power boosting. The base station may increase a power of a signal by applying the resource configuration of the power boosting, thus improving the strength of the signal received by the first type UE. In this way, a need of the first type UE for the signal strength is met, and the success rate of the first type UE receiving the RAR is improved.

In an embodiment, the DCI is configured to schedule the 2-step random access resources of the first type UE. The enhanced control parameter may include a duration parameter of a monitoring time window of the RAR.

In the 2-step random access procedure, the first type UE receives the RAR in the RAR monitoring time window. Therefore, when the enhanced control parameters include the transmission repetition parameter, that is, the base station may send the RAR repeatedly to achieve the effect of power accumulation. A time domain position of the RAR sent repeatedly may exceed a time domain position of the RAR monitoring time window. Therefore, the RAR monitoring time window may be extended, such as extending the duration of the RAR monitoring time window. The duration parameter may be configured to indicate a duration of an extended RAR monitoring time window or an extended duration.

The first type UE may determine the current RAR monitoring time window after extending the duration when receiving the duration parameter, and monitor and receive the RAR within the current RAR monitoring time window after extending the duration.

In this way, the RARs sent repeatedly may be received completely. The first type UE may combine and decode the RARs received repeatedly, thus improving the success rate of decoding the RARs, and the success rate of the first type UE receiving the RARs.

In an embodiment, the duration of the monitoring time window of the RAR of the first type UE is longer than that of the RAR of the second type UE.

Since the first type UE has a lower receiving capacity than the second type UE, the base station needs to repeatedly send the RAR to improve the receiving success rate of the first type UE. Therefore, the RAR monitoring time window may be extended for the first type UE, such that the first type UE may completely receive the RARs sent repeatedly. The first type UE may combine and decode the RARs received repeatedly, thus improving the success rate of decoding the RARs, and the success rate of the first type UE receiving the RARs.

In an embodiment, the duration parameter of the monitoring time window of the RAR includes the number of slots of the monitoring time window.

The duration of the monitoring time window may be expressed by the number of slots, so a time window extending parameter may be employed to indicate the number of increased slots in the RAR monitoring time window.

Exemplarily, the duration parameter may occupy multiple bits to indicate the number of increased slots. For example, as illustrated in Table 3, 01 may represent increasing one slot, and 10 may represent increasing two slots. The duration parameter may also indicate the number of slots in the extended RAR monitoring time window. Exemplarily, the duration parameter may indicate that the number of slots in the extended RAR monitoring time window is 12.

A detailed embodiment is provided in connection with any of the above embodiments.

An enhanced control indication newly defined for a Redcap UE is carried in the DCI of the Msg2 PDSCH at the base station.

An indication field newly defined by the DCI is only for the Redcap UE, and only the Redcap UE can interpret the indication field.

The indication field refers to a k-bits reserved field of DCI 1_0, and indication content other than the K-bits reserved field is compatible for other type of UEs, where the value of k is determined based on an enhancement need.

The content indicated by the indication field may be enhancement information for the Msg2 PDSCH;

The indication field indicates the enhanced monitoring time window, and also implicitly indicates the increase of the widow;

The indication field may also indicate not enhancing a time window, but only indicate the enhancement.

If the base station does not enhance the Redcap UE, all bits of the indication field are equal to 0 or 1.

If the base station enhances the Redcap UE, k bits may be encoded to correspond to different indication configurations. At the UE Side:

The Redcap UE obtains control information based on the determined configuration in the k reserved bits of the DCI. The eMBB UE does not read the k reserved bits.

When there is no enhancement, such as the above configuration of all the bits being 0 or all the bits being 1, it means that the base station does not enhance the Redcap UE, which is the same as the eMBB UE. Then the processing for the Redcap UE is the same as that for the eMBB UE.

Figure 5:
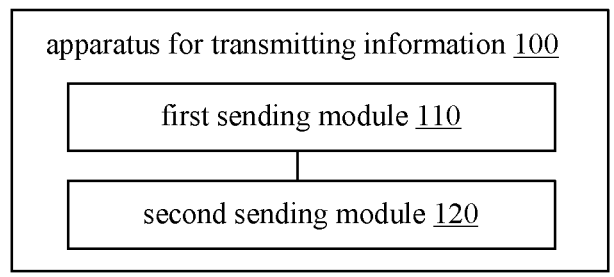
FIG. 5 is a block diagram illustrating an apparatus for transmitting information according to an embodiment.

Embodiments of the disclosure also provide an apparatus for transmitting information, applied to a base station in a wireless communication. As illustrated in FIG. 5, the apparatus 100 for transmitting the information includes a first sending module 110.

The first sending module 110 is configured to send downlink control information (DCI) carrying an enhanced control indication. The enhanced control indication includes enhanced control parameters for random access of a first type user equipment (UE) with a first receiving capability, and the enhanced control parameters are configured to enhance message transmission of the first type UE in a random access procedure.

In an embodiment, the enhanced control parameters at least includes: an enhanced control parameter for a random access response (RAR) of the first type UE.

The apparatus 100 also includes:
a second sending module 120, configured to send an enhanced RAR to the first type UE based on the enhanced control parameter.

In an embodiment, the DCI is configured to schedule 2-step random access resources or 4-step random access resources.

In an embodiment, the enhanced control indication is carried by a reserved bit of the DCI.

In an embodiment, the enhanced control parameters include a transmission repetition parameter of the RAR.

In an embodiment, the DCI is configured to schedule 2-step random access resources of the first type UE.

The enhanced control parameters may include a duration parameter of a monitoring time window of the RAR.

In an embodiment, the duration parameter of the monitoring time window of the RAR of the first type UE is greater than that of the RAR of a second type UE.

In an embodiment, the duration parameter of the monitoring time window of the RAR includes a number of slots in the monitoring time window.

In an embodiment, the first receiving capability of the first type UE is lower than a second receiving capability of a second type UE.

In an embodiment, a number of antennas in the first type UE is less than that in the second type UE.

In an embodiment, the enhanced control parameters may include: an enhanced control parameter for an Msg3 in a 4-step random access procedure of the first type UE.

In an embodiment, the enhanced control parameter for the Msg3 of the first type UE indicates an offset value of a number of transmission repetitions of the Msg3.

In an embodiment, the enhanced control indication is also configured to indicate whether to apply the enhanced control parameters.

Figure 6:
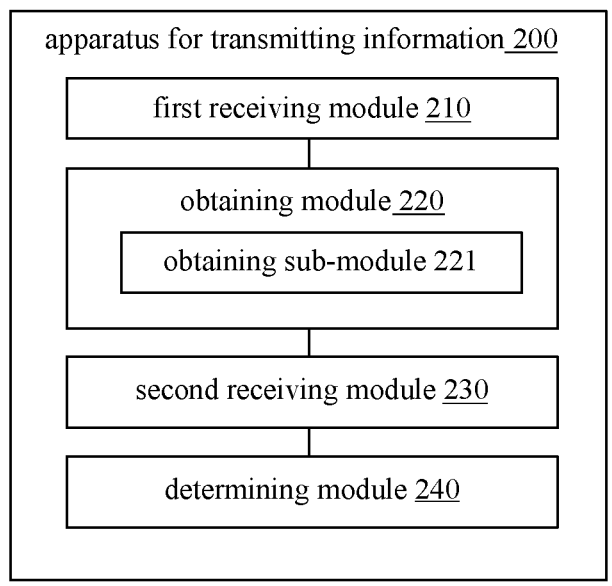
FIG. 6 is a block diagram illustrating another apparatus for transmitting information according to an embodiment.

Embodiments of the disclosure also provide an apparatus for transmitting information, applied to a UE in a wireless communication. The UE is a first type UE with a first receiving ability. As illustrated as FIG. 6, the apparatus 200 for transmitting the information includes: a first receiving module 210 and an obtaining module 220.

The first receiving module 210 is configured to receive downlink control information (DCI).

The obtaining module 220 is configured to obtain an enhanced control indication carried by the DCI. The enhanced control indication includes enhanced control parameters for random access of the first type UE. The enhanced control parameters are configured to enhance message transmission of the first type UE in a random access procedure.

In an embodiment, the obtaining module 220 at least includes:
an obtaining sub-module 221, configured to obtain an enhanced control parameter for a random access response (RAR) of the first type UE.

The apparatus also includes:
a second receiving module 230, configured to receive an enhanced RAR based on the enhanced control parameter.

In an embodiment, the DCI is configured to enhance 2-step random access resources or 4-step random access resources.

In an embodiment, the enhanced control indication is carried by a reserved bit of the DCI.

In an embodiment, the enhanced control parameters include a transmission repetition parameter of the RAR.

In an embodiment, the DCI is configured to schedule 2-step random access resources of the first type UE, and the enhanced control parameters include a duration parameter of a monitoring time window of the RAR.

In an embodiment, the duration parameter of the monitoring time window of the RAR of the first type UE is greater than that of the RAR of the second type UE.

In an embodiment, the duration parameter of the monitoring time window of the RAR includes a number of slots in the monitoring time window.

In an embodiment, the first receiving capability of the first type UE is lower than a second receiving capability of the second type UE.

In an embodiment, a number of antennas in the first type UE is less than that in the second type UE.

In an embodiment, the enhanced control parameters include an enhanced control parameter for an Msg3 in a 4-step random access procedure of the first type of UE.

In an embodiment, the enhanced control parameter for the Msg3 of the first type UE indicates an offset value of a number of transmission repetitions of the Msg3.

In an embodiment, the apparatus 200 also includes:
a determining module 240, configured to determine whether a base station applies the enhanced control parameters based on the enhanced control indication.

In an embodiment, the first sending module 110, the second sending module 120, the first receiving module 210, the obtaining module 220, the second receiving module 230, the determining module 240, etc. may be implemented by one or more central processing units (CPUs), graphic processing units (GPUs), baseband processors (BPs), application specific integrated circuits (ASICs), DSPs, programmable logic devices (PLDs), complex programmable logic devices (CPLDs), field-programmable gate array (FPGAs), general-purpose processors, controllers, microcontroller units, microprocessors, or other electronic components, and configured to execute the above methods.

Figure 7:
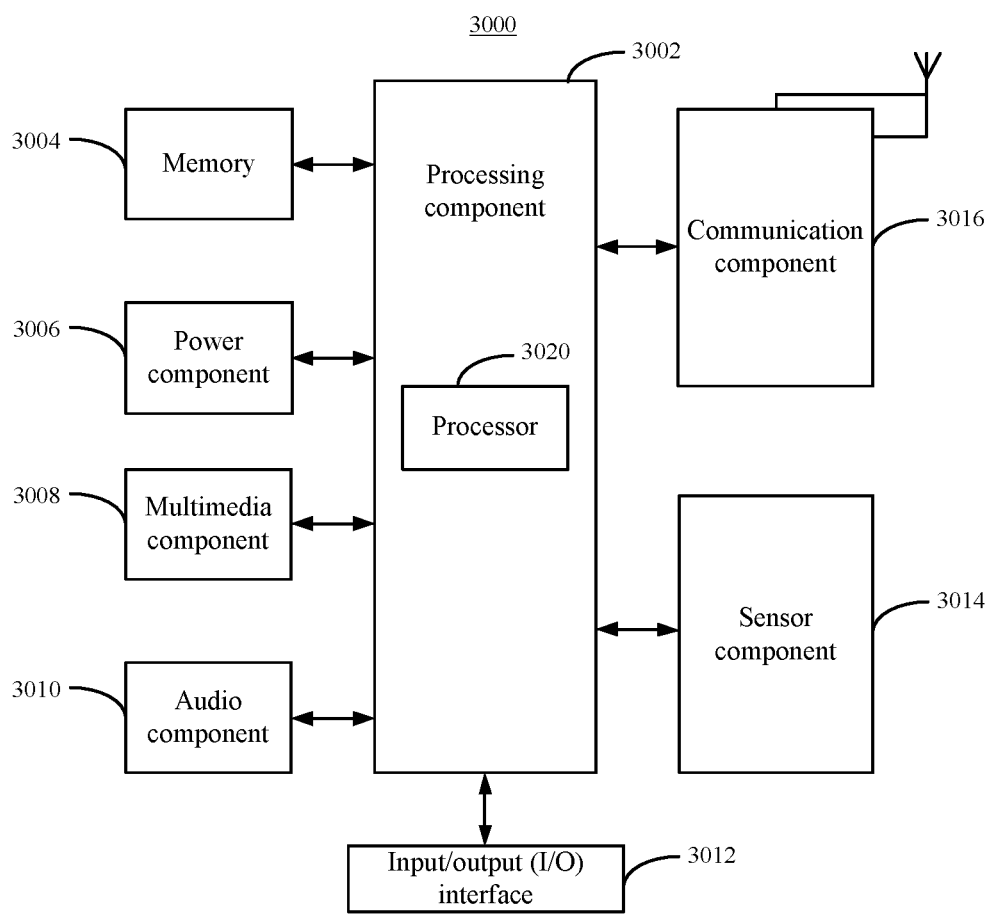
FIG. 7 is a block diagram illustrating a device for transmitting information according to an embodiment.

FIG. 7 is a block diagram illustrating a device 3000 for transmitting information according to an embodiment. For example, the device 3000 may be a mobile phone, a computer, a digital broadcasting terminal, a message sending and receiving equipment, a game controller, a tablet device, a medical device, a fitness equipment, a personal digital assistant or the like.

As illustrated in FIG. 7, the device 3000 may include one or more of: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3002 to execute instructions to perform all or part of the steps in the above described methods. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000 for performing contraction data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 is configured to provide power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as an adjustment mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") for receiving an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 is configured to provide an interface between the processing component 3002 and peripheral interface modules, such as a keyboard, a click wheel, buttons, and the like. The buttons may include, but be not limited to, a home button, a volume button, a starting button, and a locking button.

The sensor component 3014 includes one or more sensors for providing status assessments of various aspects of the device 3000. For example, the sensor component 3014 may detect an open/closed status of the device 3000, relative positioning of components, e.g., the display and the keypad of the device 3000, a change in position of the device 3000 or a component of the device 3000, a presence or absence of user contraction with the device 3000, an orientation or an acceleration/deceleration of the device 3000, and a change in temperature of the device 3000. The sensor component 3014 may include a proximity sensor for detecting the presence of nearby objects without any physical contact. The sensor component 3014 may also include a light sensor, such as a CMOS (complementary metal-oxide-semiconductor)) or a CCD (charge coupled device) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 may access a wireless network based on a communication standard, such as Wi-Fi, 2G, or 3G, or a combination thereof. In one embodiment, the communication component 3016 receives a broadcast signal or broadcast associated information from an external broadcast management system via a broadcast channel. In an embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an embodiment, there is also provided a non-transitory computer readable storage medium including instructions, such as the memory 3004 including the instructions. The instruction may be executed by the processor 820 in the device 3000 for performing the above methods. For example, the non-transitory computer readable storage medium may be a ROM, a RAM, a CD-ROM, a magnetic tape, a floppy disc, an optical data storage device, and the like.

With the method and apparatus for transmitting the information, the communication device, and the storage medium according to embodiments of the disclosure, the DCI carrying the enhanced control indication is sent. The enhanced control indication includes the enhanced control parameters for random access of the first type UE with the first receiving capability. The enhanced control parameters are configured to enhance message transmission of the first type UE in the random access procedure. In this way, for the first type UE, the enhanced control parameters are carried in the DCI. On the one hand, the downlink signaling of the first type UE may be sent based on the enhanced control parameters, such that transmission of the downlink signaling is improved compared with other types of UEs, thus meeting the receiving strength needs of the first type UE with a poor receiving capability, improving the success rate of receiving a wireless signal by the first type UE, and reducing retransmission due to reception failure, and further improving the utilization efficiency of transmission resources. On the other hand, the first type UE does not need to report the UE type, thus reducing interactions.

Other implementations of the disclosure may be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as only, with a true scope of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only be limited by the appended claims.

What is claimed is:

1. A method for transmitting information, performed by a base station, comprising:
   sending downlink control information (DCI), by a random access response (RAR) physical downlink control channel (PDCCH) signaling, carrying an enhanced control indication, wherein the enhanced control indication comprises enhanced control parameters for random access of a first type user equipment (UE) with a first receiving capability, and the enhanced control parameters are configured to enhance message transmission of the first type UE in a random access procedure.

2. The method of claim 1, wherein the enhanced control parameters at least comprise:
   an enhanced control parameter for a RAR of the first type UE; and
   the method further comprises: sending an enhanced RAR, by a physical downlink shared channel (PDSCH) signaling, to the first type UE based on the enhanced control parameter.

3. The method of claim 2, wherein the DCI is configured to schedule 2-step random access resources of the first type UE, and
   the enhanced control parameters comprise a duration parameter of a monitoring time window of the RAR.

4. The method of claim 3, wherein the duration parameter of the monitoring time window of the RAR of the first type UE is greater than that of the RAR of a second type UE;
   wherein the duration parameter of the monitoring time window of the RAR comprises a number of slots in the monitoring time window.

5. The method of claim 1, wherein the DCI is configured to schedule 2-step random access resources or 4-step random access resources.

6. The method of claim 2, wherein the enhanced control indication is carried by a reserved bit of the DCI; or wherein the enhanced control parameters comprise a transmission repetition parameter of the RAR.

7. The method of claim 1, wherein the first receiving capability of the first type UE is lower than a second receiving capability of a second type UE;
   wherein a number of antennas in the first type UE is less than that in the second type UE.

8. The method of claim 1, wherein the enhanced control parameters comprise:
   an enhanced control parameter for an Msg3 in a 4-step random access procedure of the first type UE.

9. The method of claim 8, wherein the enhanced control parameter for the Msg3 of the first type UE indicates an offset value of a number of transmission repetitions of the Msg3;
   wherein the enhanced control indication is also configured to indicate whether to apply the enhanced control parameters.

10. A method for transmitting information, performed by a first type user equipment (UE) with a first receiving ability, comprising:
    receiving downlink control information (DCI), by a random access response (RAR) physical downlink control channel (PDCCH) signaling from a base station; and
    obtaining an enhanced control indication carried by the DCI, wherein the enhanced control indication comprises enhanced control parameters for random access of the first type UE, and the enhanced control parameters are configured to enhance message transmission of the first type UE in a random access procedure.

11. The method of claim 10, wherein obtaining the enhanced control indication carried by the DCI at least comprises:
    obtaining an enhanced control parameter for a RAR of the first type UE; and the method further comprises: receiving an enhanced RAR, by a physical downlink shared channel (PDSCH) signaling, based on the enhanced control parameter.

12. The method of claim 11, wherein the enhanced control parameters comprise a repeated transmission parameter of the RAR.

13. The method of claim 11, wherein the DCI is configured to schedule 2-step random access resources of the first type UE, and the enhanced control parameters comprise a duration parameter of a monitoring time window of the RAR.

14. The method of claim 13, wherein the duration parameter of the monitoring time window of the RAR of the first type UE is greater than that of the RAR of the second type UE;
    wherein the duration parameter of the monitoring time window of the RAR comprises a number of slots in the monitoring time window.

15. The method of claim 10, wherein the DCI is configured to schedule 2-step random access resources or 4-step random access resources.

16. The method of claim 10, wherein the enhanced control indication is carried by a reserved bit of the DCI.

17. The method of claim 10, wherein the first receiving capability of the first type UE is lower than a second receiving capability of the second type UE;
    wherein a number of antennas in the first type UE is less than that in the second type UE.

18. The method of claim 10, wherein the enhanced control parameters comprise an enhanced control parameter for an Msg3 in a 4-step random access procedure of the first type of UE.

19. The method of claim 18, wherein the enhanced control parameter for the Msg3 of the first type UE indicates an offset value of a number of repeated transmissions of the Msg3;

wherein the method further comprises:
determining whether a base station applies the enhanced control parameters based on the enhanced control indication.

20. A communication device, comprising:
a processor; and
a memory, coupled to the processor and stored with a computer executable program for information transmission,
wherein when the computer executable program is executed by the processor, the processor is configured to:
receive downlink control information (DCI), by a random access response (RAR) physical downlink control channel (PDCCH) signaling from a base station; and
obtain an enhanced control indication carried by the DCI, wherein the enhanced control indication comprises enhanced control parameters for random access of the first type UE, and the enhanced control parameters are configured to enhance message transmission of the first type UE in a random access procedure.

* * * * *